Feb. 26, 1957 — M. HARLEY — 2,782,557
PUMP OPERATED CALL DEVICE
Filed March 12, 1956
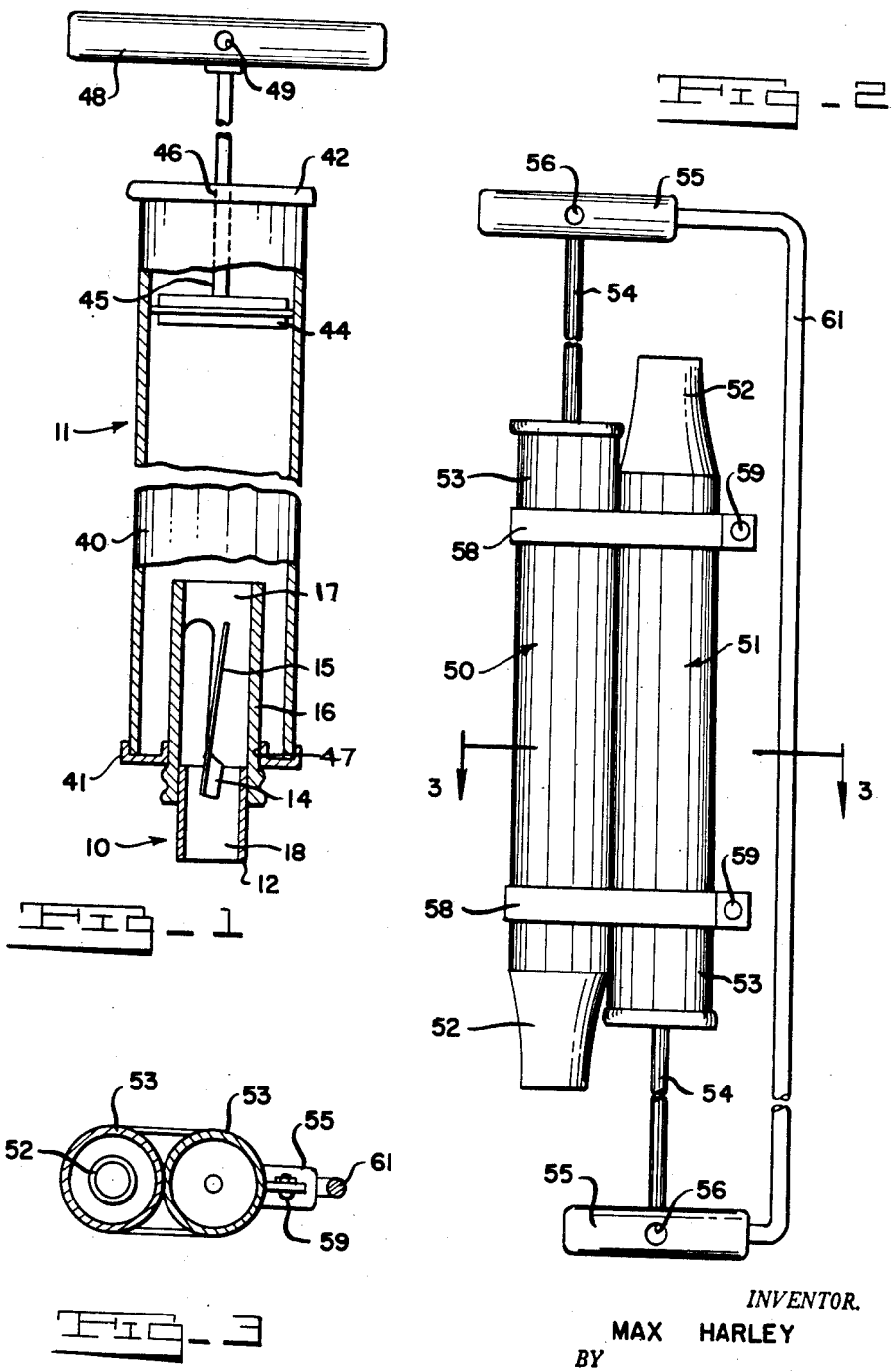
INVENTOR.
MAX HARLEY
BY Cullen & Cantor
ATTORNEYS

United States Patent Office 2,782,557
Patented Feb. 26, 1957

2,782,557

PUMP OPERATED CALL DEVICE

Max Harley, Detroit, Mich.

Application March 12, 1956, Serial No. 571,021

1 Claim. (Cl. 46—180)

This application relates to call devices and particularly to pump operated call devices.

A call device is a device used for calling game birds or animals. One such device, as manufactured by the Philip S. Olt Company of Pekin, Illinois, is a black hard rubber mouthpiece into which the caller blows at one end for vibrating a reed and thus simulating a bird call.

In a prior application, Serial No. 531,051 of August 29, 1955, I disclosed a call device of which the conventional call device forms only a part, with the remainder of the device being in the form of a transversely ribbed cylinder flexible air-tight material such as rubber. The call device of that application is manipulated, without blowing into the mouthpiece, but rather by shaking or vibrating the rubber tube.

In this application I disclose a call device of which the conventional call device also forms only a part, with the remainder of the call device being in the form of a piston or cylinder or pump arrangement.

The device as a whole enables superior calls to be performed, all without requiring the user to blow into the call device, thus eliminating the difficulties that might arise in freezing weather due to the presence of moisture from the user's breath freezing in the device and thus freezing the reed against vibration.

More specifically, a principal object is to provide a call device which is operated by hand movement involving the movement of the piston and cylinder relatively.

A further object of the invention will presently be understood upon reference to the appended drawing and description.

In this drawing:

Fig. 1 is an elevation view of one embodiment with parts cut away for clarity.

Fig. 2 is a similar view of a double acting modified embodiment.

Fig. 3 is a section view on line 3—3 of Fig. 2.

The call device of Fig. 1 comprises a conventional head 10 and a body 11.

The head 10 is a conventional mouthpiece call and has a hollow reed holder 12, a reed cork 14, and a reed 15, all disposed within a hollow element 16, these parts forming a mouthpiece or head 10 normally blown into by one's mouth at the air inlet 17 with air exiting at outlet 18.

The mouthpiece 10 just described forms only one part of my entire device. The other part, the body 11, is a long cylindrical tube 40 of sheet metal or the like, air tight and having closures at both ends indicated at 41—42.

Within the tube or cylinder 40 is a piston 44 to which is connected a piston rod 45 passing through an opening 46 in the closure 42 and connected to a handle 48 having a transverse hole 49.

The piston rod 45 seals the hole 46 in the closure 42 and the mouthpiece 10 seals the hole 47 in the closure 41.

It will be observed that movement of the handle and cylinder relatively will cause relative movement of the piston and cylinder and movement of the piston and mouthpiece 10 relatively with the result that as the piston is moved towards the mouthpiece, air is forced through the latter so that the reed vibrates and emits calls.

The hole 49 in the handle 48 enables the device to be mounted, as for example on the belt of the person using the device, with the cylinder and the mouthpiece hanging down along side his leg. With one hand then he can slide the cylinder up and down relative to the piston to enable calls to be emitted with one hand operation.

The hole 49 or some other equivalent means may be used to mount the handle 48 in a stationary location as for example on a seat of a boat; or; as an alternative the cylinder may be stationarily mounted and the handle manipulated, the mounting of the cylinder being effected by a clamp, or strap, or the like, not shown. Thus mounted, the device can be manipulated with one hand while in a relatively stationary mounted position, simply by sliding either of the handle or cylinder towards and away from the other part, handle or cylinder.

It is also possible to provide an elongated piston rod 45 or a remote control operation means for the handle 48 in the form of a Bowden wire or the like whereby remote control and operation of the device may be provided. Thus, the device may be stationarily mounted and located in a tree or bush and manipulated by a hunter located at a distance from the device itself, operation being effected by means of the remote control means.

It will be observed that the device is so constructed that it may be operated for emitting calls without blowing into the mouthpiece. Likewise, the device may be operated for emitting calls by one hand operation as described, and also may be remotely operated.

Figs. 2 and 3 show a double acting embodiment wherein each of the devices 50 and 51 is according to the disclosure of Fig. 1 and includes a conventional head 52 like the head 10 of Fig. 1 and a piston and cylinder pump body 53 like the body 11 with its associate piston and handle parts of Fig. 1, the piston rods 54, handle 55 and handle hole 56 being shown in Figs. 2 and 3.

The bodies 50 and 51 are mounted alongside each other but reversed from each other shown and are connected to each other in a unitary assembly as by means of encircling clamping straps 58 fastened by clamping screws 59. The handles 55 are interconnected by a connected rod 61.

When either of the handles is manipulated as for example by manipulation of one handle, or by manipulation of the assembled cylinders or bodies, or by manipulation of the connecting rod 61, the device operates for pumping air through the head, on both the push and pull strokes to give a double acting double speed call.

Now having described the call devices herein disclosed, reference should be had to the claim which follows.

I claim:

A double acting call device comprising two oppositely disposed side by side single acting call units arranged in a unitary assembly, each unit having a call head and a body, said head having a vibrating reed and open at both ends to provide air inlet and outlet ports, said body comprising a long airtight tube or cylinder open at both ends, with the head disposed in and seal fitted in one end opening with its air inlet port inside the cylinder, a piston in said cylinder, a piston rod connected to said piston and passing through the other end opening of said cylinder, means for securing the two units together side by side and in opposed relation to form a unitary assembly, with each unit having its call head located adjacent the piston rod of the other unit, and common actuating means for said piston rods for moving each of them relative to its cylinder and moving both of them simultaneously in the same direction, but with opposite effects on the heads associated with said piston rods, the actuating means being a long rod alongside the device and extending from end to end of it and connected at its opposite ends to the two opposed piston rods.

References Cited in the file of this patent

UNITED STATES PATENTS

| | | |
|---|---|---|
| 277,581 | Leggett | May 15, 1883 |
| 321,202 | Fisher | June 30, 1885 |
| 394,243 | Briggs | Dec. 11, 1888 |
| 497,759 | Beardsley | May 23, 1893 |
| 766,027 | Fairchild | July 26, 1904 |
| 1,482,475 | Marcus | Feb. 5, 1924 |
| 1,558,934 | Sherrill | Oct. 27, 1925 |
| 2,056,623 | Scott | Oct. 6, 1936 |
| 2,072,786 | Yager | Mar. 2, 1937 |
| 2,302,318 | Henry | Nov. 17, 1942 |

FOREIGN PATENTS

| | | |
|---|---|---|
| 606,833 | Germany | Dec. 12, 1934 |